United States Patent
Jackson et al.

(10) Patent No.: US 10,269,107 B2
(45) Date of Patent: Apr. 23, 2019

(54) SELECTIVE PLANT DETECTION AND TREATMENT USING GREEN LUMINANCE PHOTOMETRIC MACHINE VISION SCAN WITH REAL TIME CHROMATICITY OPERATIONS AND IMAGE PARAMETER FLOORS FOR LOW PROCESSING LOAD

(71) Applicants: Jonathan A Jackson, Dayton, OH (US); Norman Novotney, Mason, OH (US); Christopher Carter, Dayton, OH (US); Austin Erdman, Dayton, OH (US); Patrick A Jackson, Dayton, OH (US)

(72) Inventors: Jonathan A Jackson, Dayton, OH (US); Norman Novotney, Mason, OH (US); Christopher Carter, Dayton, OH (US); Austin Erdman, Dayton, OH (US); Patrick A Jackson, Dayton, OH (US)

(73) Assignee: Global Neighbor Inc, Dayton, OH (US)

( * ) Notice: Subject to any disclaimer, the term of this patent is extended or adjusted under 35 U.S.C. 154(b) by 289 days.

(21) Appl. No.: 15/440,985

(22) Filed: Feb. 23, 2017

(65) Prior Publication Data
US 2018/0240228 A1    Aug. 23, 2018

(51) Int. Cl.
*G06T 7/00* (2017.01)
*H04N 5/232* (2006.01)
(Continued)

(52) U.S. Cl.
CPC ......... *G06T 7/0004* (2013.01); *A01M 7/0089* (2013.01); *A01M 21/02* (2013.01);
(Continued)

(58) Field of Classification Search
CPC .... A01M 21/02; A01M 21/04; A01M 21/043; A01M 7/0089; G03B 11/00;
(Continued)

(56) References Cited

U.S. PATENT DOCUMENTS 5,296,702 A   3/1994   Beck
5,389,781 A   2/1995   Beck et al.
(Continued)

OTHER PUBLICATIONS

By inference, likely Todd Nichols as evidenced by a link (Anser Enterprise Home) displayed on the left top of http://www.anser-e.com/AlgorithmEngineering/ComputerVisionAlgorithms.html, a web page on the World Wide Web, and having a displayed Title = Experimental Object Identification Algorithms and OpenCV. Inferred date = 2014 from copyright label at bottom of same web page; Location apparently stated to be "located in the San Francisco Bay/Silicon Valley area" as seen at the above-referenced link (Anser Enterprise Home). Total printed pages of web pages is 2.

*Primary Examiner* — Edward Park
(74) *Attorney, Agent, or Firm* — Elting Patents & Technology LLC; Mark J Elting

(57) ABSTRACT

A field image is formed using a tristimulus color model and used to detect target plants or entities on a field. Through the use of a luminance parameter floor, hue and saturation selection steps, feature recognition, a sizing floor and an aspect ratio ceiling, a very fast way is devised to recognize a target plant without need for consulting plant attribute databases, or to analyze spectral or other specialized data for comparison with known attributes. This allows a low calculational processing load and use of simple hardware such as a single board computer to handle machine vision in real time. Treatment steps can include a spray event, a light treatment, and a thermal/mechanical trauma.

6 Claims, 11 Drawing Sheets

(51) Int. Cl.
| | |
|---|---|
| *H04N 9/00* | (2006.01) |
| *H04N 9/04* | (2006.01) |
| *G06T 7/90* | (2017.01) |
| *G06T 11/60* | (2006.01) |
| *G06T 7/11* | (2017.01) |
| *G06K 9/62* | (2006.01) |
| *G06K 9/46* | (2006.01) |
| *G03B 11/00* | (2006.01) |
| *A01M 7/00* | (2006.01) |
| *A01M 21/02* | (2006.01) |
| *A01M 21/04* | (2006.01) |

(52) U.S. Cl.
CPC .......... *A01M 21/04* (2013.01); *A01M 21/043* (2013.01); *G03B 11/00* (2013.01); *G06K 9/4661* (2013.01); *G06K 9/6267* (2013.01); *G06T 7/11* (2017.01); *G06T 7/90* (2017.01); *G06T 11/60* (2013.01); *H04N 5/23229* (2013.01); *H04N 5/23293* (2013.01); *H04N 9/00* (2013.01); *H04N 9/04* (2013.01); *G06T 2207/20224* (2013.01); *G06T 2207/30188* (2013.01)

(58) Field of Classification Search
CPC .... G06K 9/4661; G06K 9/6267; G06T 11/60; G06T 7/0004; G06T 7/11; G06T 7/90; G06T 2207/20224; G06T 2207/30188; H04N 5/23229; H04N 5/23293; H04N 9/00; H04N 9/04
See application file for complete search history.

(56) References Cited

U.S. PATENT DOCUMENTS

| | | |
|---|---|---|
| 5,793,035 A | 8/1998 | Beck |
| 5,924,239 A | 7/1999 | Rees |
| 6,795,568 B1 | 9/2004 | Christiansen et al. |
| 6,919,959 B2 | 7/2005 | Masten |
| 7,099,004 B2 | 8/2006 | Masten |
| 7,417,731 B1 | 8/2008 | Masten |
| 9,025,154 B2 | 5/2015 | Alameh |
| 9,030,549 B2 | 5/2015 | Redden |
| 9,064,173 B2 | 6/2015 | Redden |
| 9,769,430 B1 * | 9/2017 | Bechtel .................. H04N 7/183 |
| 2002/0024665 A1 | 2/2002 | Masten |
| 2005/0122513 A1 | 6/2005 | Masten |
| 2011/0211733 A1 | 9/2011 | Schwartz |
| 2013/0235183 A1 | 9/2013 | Redden |
| 2013/0238201 A1 | 9/2013 | Redden |
| 2015/0015697 A1 | 1/2015 | Redden |
| 2015/0027040 A1 | 1/2015 | Redden |
| 2015/0027041 A1 | 1/2015 | Redden |
| 2015/0027043 A1 | 1/2015 | Redden |
| 2015/0027044 A1 | 1/2015 | Redden |
| 2015/0245554 A1 | 9/2015 | Redden |
| 2015/0293115 A1 * | 10/2015 | Buhimschi ............ G01N 33/52 436/86 |
| 2015/0310633 A1 | 10/2015 | Nelan |
| 2016/0187199 A1 | 6/2016 | Brunk |

* cited by examiner

1931 CIE CHROMATICITY DIAGRAM

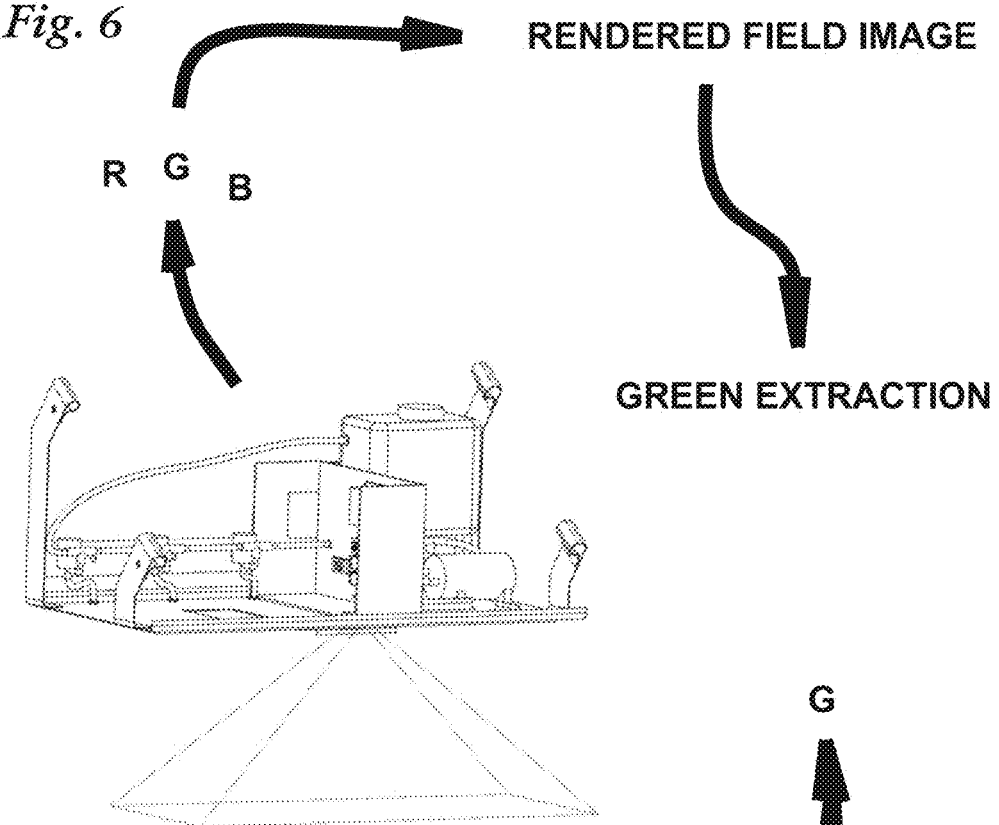
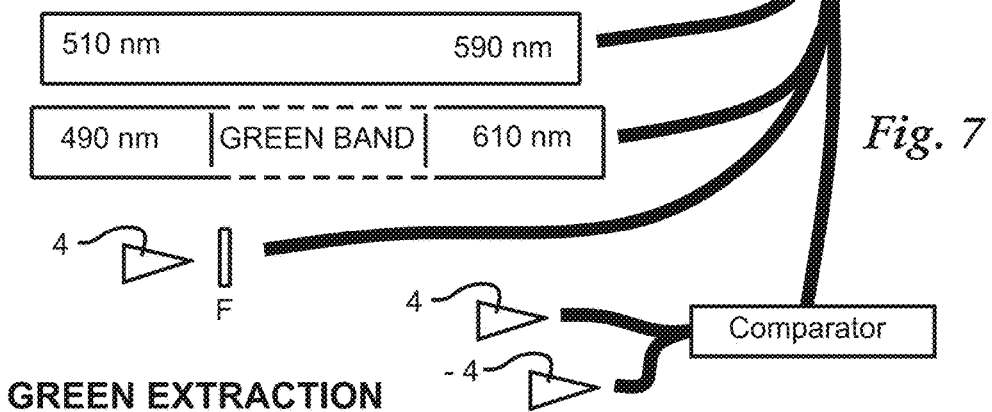

SELECTIVE PLANT DETECTION AND TREATMENT USING GREEN LUMINANCE PHOTOMETRIC MACHINE VISION SCAN WITH REAL TIME CHROMATICITY OPERATIONS AND IMAGE PARAMETER FLOORS FOR LOW PROCESSING LOAD

TECHNICAL FIELD

This invention relates to detection and elimination of broadleaf weeds and target plants using methods that insure processing with a low computational load and no need to consult certain databases, but it can apply generally to detection and correction of defects in manufactured products and the like. The teachings herein can be used for many purposes, including plant and weed control using selective targeted spray treatment, illumination trauma and thermal/mechanical trauma.

The invention can be used to delivery thermal/mechanical trauma, such as that stab unit of an invasive hot stab plant eradicator as disclosed in U.S. Pat. Nos. 7,954,276 and 8,141,292, and 8,365,464 to Jackson, all of which are hereby incorporated herein by reference in their entirety.

The use of the invention in conjunction with the delivery of selective illumination trauma relates to a relatively low energy rapid unnatural illumination protocol of duration less than one minute to induce plant death, by altering cellular metabolism, causing plant component damage, hormonal changes, damage to photosynthetic apparatus, and possible interruption of healthy symbiosis of a plant root with rhizosphere microorganisms surrounding the root. This use of the invention does not use high radiative energy transfers for destruction by severe scalding, heat shock, incineration, or the like. Illumination trauma can be performed as taught in U.S. Pat. No. 8,872,136 to Jackson, et. al., which is hereby incorporated herein by reference in its entirety.

BACKGROUND OF THE INVENTION

Reducing the use of pesticides for weed and plant control has become an issue of national importance. Ground water is vitally important and the use of herbicides to prevent weeds from growing in homeowner and commercial lawns adversely impacts the quality of ground water. Most herbicides are persistent, soluble in water, and ingestion at high toxicity levels can be carcinogenic, affecting the human nervous system and causing endocrine disruption.

Ninety-five percent of fresh water on earth is ground water. Ground water is found in natural rock formations called aquifers, and are a vital natural resource with many uses. Over 50% of the USA population relies on ground water as a source of drinking water, especially in rural areas.

Recent decades have seen the rise of intelligent systems, especially large agricultural systems run by controllers or computers that detect weeds, surface and soil defects, pests and the like. These systems are used to provide for selectively targeted, judicious use of pesticides in managing weeds and other undesirable or predatory plants on fields, lawns and grasslands. This helps avoid runoff from rain or melting snow, and direct poisoning of animals via direct exposure.

Known commonly used spray treatments include Spectracide® (Spectrum Brands™ Middleton, Wis., USA), a non-selective fast acting liquid pesticide that kills all plants, ideal for use with a selective plant treatment system as illustratively shown in this disclosure. Another known spray treatment is 2,4-Dichlorophenoxyacetic acid, an organic compound which kills most broadleaf weeds by inducing uncontrolled growth in them, but spares most grasses on lawn and turf and crop fields.

There is a tremendous economic incentive, too, to reduce use of pesticides. Large land areas under treatment consume large volumes of liquid or other treatments, a huge expense and a labor intensive task for distribution.

Now referring to FIG. 1, a schematic representation of a general electromagnetic spectrum is shown for wavelengths of radiation of significance that are potentially incident upon a plant, with wavelengths ranging from 1 mm to less than 100 nm. In the infrared portion, or heat radiation portion of the electromagnetic spectrum, the near-infrared, or near-IR, as it is commonly known, ranges in wavelength from 700 nm to 3 microns. Visible light is generally taken to range approximately from 700 nm to 400 nm. Ultraviolet radiation is generally taken to be of wavelength less than 400 nm, with near-ultraviolet further divided into known portions UV-A (400-320 nm), UV-B (320-280 nm) and UV-C (280 nm-100 nm), which is extremely dangerous for humans and is often used as a germicidal radiation to purify water and kill bacteria, viruses, and other organisms.

Photosynthesis in plants makes use of visible light, especially blue and red visible light, and ultraviolet light, to varying degrees, depending on a host of factors including plant species and type, radiation exposure history and other factors. Approximately seven percent of the electromagnetic radiation emitted from the sun is in a UV range of about 200-400 nm wavelengths. Nearly all plants have low absorbance of the green portion of the visible spectrum and exhibit strong characteristic green reflectance. Although some plants can be characterized via spectral analysis of light reflected off from leaves and stems, etc., this type of detection requires special arrangements, calibrations, processing demands and software, and is prone to error and non-operation due to local conditions, plant variations, moisture and soil on leaves, and the effects of recent sun exposure history, which can change the tone or color of leaves and plant parts, which adapt to irradiation, often for protection against internal scalding.

Specifically, known leaf reflectance and transmittance spectra depend on light absorption by leaf pigments and reflectance/transmittance from light multi-scattering within leaves as a function of refractive index and leaf anatomical structure. As known in the art, leaf reflectance varies with four basic biophysical properties including internal leaf anatomy, chlorophyll concentration, water content and dry matter concentration. Reflectance for plant leaves from UV through IR range (330-1300 nm) demonstrate four different reflectance patterns: 1) 330-450 nm and 680 nm with a small peak at 550 nm (green edge); 2) peak between 680-750 nm (red edge); peak at 780-1300 nm (near an infrared plateau); and decreased reflectance at 1300-2500 nm. Reflectance patterns of plant pigments show peaks for chlorophyll at 550 and 700 nm; 550 nm for anthocyanins; and 510-520 nm for carotenoids.

Also, field leaf reflectance may vary with environmental parameters like soil type, light conditions, irregular terrain, and maintenance inputs (fertilizer, watering, etc.); as well as, plant variables such as irregular/dense sowing patterns, different plant species, growth stages, leaf moisture, and similar color of crop and weeds.

Now referring to FIG. 2, a target plant and grass on a field are shown illustratively. A field on which the instant invention shall operate (shown, FIELD and 01) and shown are features arising from this field: grass Gr and an aberration, undesired entity, pest, defect or weed is shown merely for illustrative purposes as a target plant TP.

In the use of field images to detect target plants (as defined below), the use of color is complex and critical. Teachings allow selection of target plants among a large number of plants in a field using analysis of image data.

The analysis and processing of color information, or any information gathered from a color camera must operate in a color space, almost always a 3-dimensional, mathematically defined color space where each color available, of each hue, saturation and brightness, is specified using three coordinates x, y, and z. Machine vision necessarily uses what is called a rendered color space that is formed or rendered for a specific device or devices, explained further below.

Human vision itself can also be characterized using a color space, which is not rendered for a specific device, an example being known unrendered opponent color spaces, such as the CIE L*U*V* (CIELUV) or CIE L*a*b* (CIELAB) systems. The CIE (International Commission on Illumination) established in 1931 a foundation for all color management and reproduction, and the result is a chromaticity diagram which uses three coordinates, x, y, and z. A plot of this three dimensional system at maximum luminosity is universally used to describe color in terms of x and y, and this plot, famously called the 1931 chromaticity diagram, is believed to be able to describe all perceived color in humans.

FIG. 3 shows chromaticity coordinates on a standard well-known prior art cartesian 1931 CIE x-y chromaticity diagram or color map. The map shows an unrendered color map, and displays all known colors or perceivable colors at maximum luminosity as a function of chromaticity coordinates x and y, with nanometer light wavelengths, with regions corresponding to red (R), green (G) and blue (B). A selected illustrative color gamut, or allowable range of colors, for a color model is shown as a hatched triangle in the figure.

Color models draw very specifically from human vision, which uses an enormously complex sensory and neural apparatus to produce sensations of color and light effects, and to allow distinguishing perhaps 10 million distinct colors. In the human eye, for color-receiving or photopic vision, there are three sets of approximately 2 million sensory bodies called cones which have absorption distributions which peak at 445, 535, and 565 nm light wavelengths, with a great deal of overlap. These three cone types form what is called a tristimulus system and are called B (blue), G (green), and R (red) for historical reasons; the peaks do not necessarily correspond with those of any primary colors used in a display, e.g., commonly used RGB phosphors, or in any color model. There is also interaction for scotopic, or so-called night vision bodies in the human retina called rods, which influence, under many conditions, color vision.

The nominal blue and green set of cones in the human retina having a peak absorption and sensitivities of 535 and 565 nm coincides well with the green/blue reflectivity of nearly all plants, and the peak luminosity function of human vision, which gives the human sensitivity and perceived brightness of a given radiometric input of light, peaks at 555 nm.

This means that green color is a special spectral territory that must be managed intelligently to allow successful operation of any target plant detection and treatment system if it is to avoid a high processing load or overhead.

Much of the prior art utilizes radiometric, physical methods in image analysis, and this introduces difficulties because detection of target plants is subtle and happens to be something that humans perform well and easily when compared to physical methods, such as spectral analysis.

Concerning rendered spaces, provisions for compatibility with device color models inherent to a tristimulus color models provide for fast processing of rendered field images taken from a field, even though video or display reproduction is not specifically required or sought in practicing the instant invention. It is worthwhile noting that color reproduction influences color models and color reproduction can take many forms, depending on the main objectives sought and the solution devised to meet those objectives.

Specifically, reproduction paradigms include, for example, colorimetric color reproduction, which provides a useful alternative where tristimulus values are proportional to those in the original scene. Chromaticity coordinates are reproduced exactly, but with proportionally reduced luminances. Colorimetric color reproduction is considered a reference standard for video systems.

Most video reproduction in practice attempts to achieve corresponding color reproduction, where colors reproduced have the same appearance that colors in the original would have had if they had been illuminated to produce the same average luminance level and the same reference white chromaticity as that of the reproduction.

Historically, most color reproduction encoding uses standard RGB color spaces, such as sRGB, ROMM RGB, Adobe RGB 98, Apple RGB, and video RGB spaces such as that used in the NTSC standard. Typically, an image is captured into a sensor or source device space, which is device and image specific. It may be transformed into an unrendered image space, which is a standard color space describing the original colorimetry.

However, video images are nearly always directly transformed from a source device space into a rendered image space (see Definitions section), which describes the color space of some real or virtual output device such as a video display. Most existing standard RGB color spaces are rendered image spaces. For example, source and output spaces created by cameras and scanners are not CIE-based color spaces (such as shown in the 1931 CIE chromaticity diagram) but spectral spaces defined by spectral sensitivities and other characteristics of the camera or scanner.

Rendered image spaces are device-specific color spaces based on the colorimetry of real or virtual device characteristics. In most reproduction applications, images are converted into a rendered color space for either archiving and data transfer and analysis, including video it image signals.

By using data with data generated and formed using a rendered tristimulus color model, human sensory experience is already factored into detection of target plants as defined below, and as described in this specification.

Helpful information about video and television engineering, compression technologies, data transfer and encoding, human vision, certain information about color science and perception, color spaces, colorimetry and image rendering, including video reproduction, can be found in the following references which are hereby incorporated herein in their entirety: ref[1] Color Perception, Alan R. Robertson, Physics Today, December 1992, Vol 45, No 12, pp. 24-29; ref[2] The Physics and Chemistry of Color, 2ed, Kurt Nassau, John Wiley & Sons, Inc., New York ©2001; ref[3] Principles of Color Technology, 3ed, Roy S. Berns, John Wiley & Sons, Inc., New York, ©2000; ref[4] Standard Handbook of Video and Television Engineering, 4ed, Jerry Whitaker and K. Blair Benson, McGraw-Hill, New York ©2003.

In the prior art, detecting target plants, as opposed to merely detecting a plant—is considered difficult without using very high processing power which analyzes on a sophisticated level, such as by comparing plant images to images stored in a database.

In identifying species of plants in an agricultural field, US Patent Application Publication 2005/0122513 to Masten teaches a low cost, high speed sensing method by gathering strictly radiometric spectral data using portable spectrometer, obtaining a spectral distribution of reflected wavelengths, and wirelessly transmitting that information to a remotely located analyzer. This is cumbersome, involves expensive components to form a spectrometer, and increases processing requirements. The reliance on spectrum data makes the method vulnerable to local plant reflectance characteristics, local conditions like rain drops, invites high error rates, and requires extensive calibrations.

The Weed Seeker® automatic spot spray system of Trimble, Inc., (Sunnyvale, Calif., USA) seeks green plants for reductive or eradication spraying, and uses expensive sophisticated processing. It does not perform analysis of green plants of the same approximate size to determine if a plant is a target plant.

US Patent Publication 20150309496 to KAH III of K-RAIN Manufacturing Corporation, teaches use of a database of reference data for comparison, which introduces a high computational overhead, as image comparison algorithms must perform complex calculations, and pass through logic trees after what is often pixel-by-pixel comparisons.

U.S. Pat. No. 6,795,568 to Christensen et al of TORSANA LASER TECHNOLOGIES teaches using "means for analyzing the image data and for determining whether the plant is one of a number of predetermined plants or types of plants, and, from that determination, whether the plant is to be severed or damaged" and this involves complex comparison with plant attributes contained in a storage unit (see, for example, Christensen '568 column 5, line 40), with attendant large computational overhead and the need for calibrations to insure low false positives and low false negatives.

US Patent Publication 20040034459 to Hoelscher et al of Syngenta® Corporation requires a computing means capable of reading and processing data from a computer-readable medium having stored relating to a standardized functional relationship between the amounts of individual pesticides and the biological effects achievable with said amounts on said plants. This also introduces large processing overhead and the need for uninterrupted communication with a database.

U.S. Pat. No. 5,924,239 to Rees does elementary spectral analysis and compares aggregates of field image pixels and looks for "green." It does not analyze what is a target plant such as a weed, among other plants.

Plants have varied reflectances and absorptions across this spectrum and many complex attributes. This invention seeks to use a rendered tristimulus color model and perform processing steps from data originating from the middle of the visible spectrum using low processing power to emulate larger, more complex systems.

SUMMARY OF THE INVENTION

The instant invention provides for a method for detecting a target plant on a field image using low processing overhead, without complex analysis of spectral, or near-infrared reflectance, using simple steps without reliance on an external database of plant attributes, images, spectral data, etc., and without need for complex calibration. The low calculational load allows use of simple single board computer systems to do image analysis in real time while traveling over a field.

The method can include detection and selective treatment of a target plant on a field, the method comprising:

[1] Gathering a field image using at least one of a live video feed and an image capture from the field, and forming a rendered field image therefrom with data generated and formed using a tristimulus color model;

[2] Extracting only green luminance from the rendered field image by one of [2a] selecting only colors of the tristimulus color model found in the rendered field image that correspond to light wavelengths in a range from 510 to 590 nm; [2b] selecting only colors of the tristimulus color model found in the rendered field image that correspond to light wavelengths in a selection range that includes at least one green band contained in a band selection interval located between 490 and 610 nm; [2c] interposing an optical filter so positioned and constructed that gathering the field image obtains only primarily light of a wavelength between 510 and 590 nm; and [2d] gathering a corresponding subtraction field image using a subtraction image camera, and using a comparator, subtracting non-green light correspondingly from the rendered field image so as to leave in the rendered field image at least one band of green light;

[3] Converting green luminance from the rendered field image to a gray scale field image and utilizing the gray scale field image further without hue and saturation being considered;

[4] Eliminating data by performing at least one of the following:

[4a] Eliminating small features from the gray scale field image, using at least one of a Gaussian blur and an image feature size discriminator, so as to reduce processing load;

[4b] Imposing a luminance floor on the gray scale field image to reject relatively darker features therefrom, the luminance floor selected from rejecting data of luminance under a fraction $180/256$ of the maximum luminance obtainable for pixels in the gray scale field image;

and an empirically developed effective luminance floor;

[5] Detecting continuous features in the gray scale field image;

[6] Further imposing a surface area floor on the continuous features, to reject relatively smaller surface area continuous features to form remaining continuous features, the surface area floor selected from one of:

[6a] rejecting a surface area corresponding to less than 200 mm^2 on the field, and

[6b] rejecting a surface area corresponding to a surface area that is empirically determined;

[7] Further imposing an aspect ratio ceiling on the remaining continuous features to reject any long features so as possibly to establish at least one target feature in the remaining continuous features, the aspect ratio ceiling selected from one of the aspect ratio being, on the whole, less than 5:1, and the aspect ratio ceiling being empirically determined for efficiency in finding the target feature;

[8] Triggering a communication responsive to obtaining the at least one target feature so as to trigger at least one of:

[8a] a spray event so sized and situated as to treat at least a portion of a target plant revealed by the target feature;

[8b] a light treatment to impinge upon at least a portion of a target plant revealed by the target feature; and

[8c] a thermal/mechanical trauma instant upon at least a portion of a target plant revealed by the target feature.

In addition, step [2] can additionally comprise further green plant selection selected from any of:

[2e] rejecting areas of the rendered field image of saturation under 35 of a maximum saturation of 256,

[2f] rejecting areas of the rendered field image of saturation under a saturation floor empirically determined,

[2g] rejecting areas of the rendered field image of value floor under a value of 35 out of a maximum value of 256, and

[2h] rejecting areas of the rendered field image of value floor empirically determined.

The method can also allow that steps [1]-[8] are executed in real time such that steps [8a] and [8b] and [8c] can occur with a time spacing for traverse of at least a portion of a machine gathering the field image of step [1] and moving across the field.

Additionally, step [8a] can be executed with dispatch aided by an inherent spray liquid accumulator so formed and supplied to provide operational pressure upon demand.

A similar method can be used simply to detect a target feature in a field image using low processing overhead, the method comprising:

[1] Forming a rendered field image from the field image with data generated and formed using a tristimulus color model;

[2] Extracting only green luminance from the rendered field image by one of [2a] selecting only colors of the tristimulus color model found in the rendered field image that correspond to light wavelengths in a range from 510 to 590 nm; [2b] selecting only colors of the tristimulus color model found in the rendered field image that correspond to light wavelengths in a selection range that includes at least one green band contained in a band selection interval located between 490 and 610 nm; [2c] interposing an optical filter so positioned and constructed that gathering the field image obtains only primarily light of a wavelength between 510 and 590 nm; and [2d] gathering a corresponding subtraction field image using a subtraction image camera, and using a comparator, subtracting non-green light correspondingly from the rendered field image so as to leave in the rendered field image at least one band of green light;

[3] Converting green luminance from the rendered field image to a gray scale field image and utilizing the gray scale field image further without hue and saturation being considered;

[4] Eliminating data by performing at least one of the following:

[4a] Eliminating small features from the gray scale field image, using at least one of a Gaussian blur and an image feature size discriminator, so as to reduce processing load;

[4b] Imposing a luminance floor on the gray scale field image to reject relatively darker features therefrom, the luminance floor selected from rejecting data of luminance under a fraction $180/256$ of the maximum luminance obtainable for pixels in the gray scale field image;

and an empirically developed effective luminance floor;

[5] Detecting continuous features in the gray scale field image;

[6] Further imposing a surface area floor on the continuous features, to reject relatively smaller surface area continuous features to form remaining continuous features, the surface area floor selected from one of:

[6a] rejecting a surface area corresponding to less than 200 mm^2 on the field, and

[6b] rejecting a surface area corresponding to a surface area that is empirically determined; and

[7] Further imposing an aspect ratio ceiling on the remaining continuous features to reject any long features so as possibly to establish at least one target feature in the remaining continuous features, the aspect ratio ceiling selected from one of the aspect ratio being, on the whole, less than 5:1, and the aspect ratio ceiling being empirically determined for efficiency in finding the target feature.

Additionally, step [2] can additionally comprise further green selection selected from any of:

[2e] rejecting areas of the rendered field image of saturation under 35 of a maximum saturation of 256,

[2f] rejecting areas of the rendered field image of saturation under a saturation floor empirically determined,

[2g] rejecting areas of the rendered field image of value floor under a value of 35 out of a maximum value of 256, and

[2h] rejecting areas of the rendered field image of value floor empirically determined.

BRIEF DESCRIPTION OF THE DRAWINGS

FIGS. 6 and 7 show schematic representations of certain process steps to extract green luminance from a rendered field image;

DEFINITIONS

Figure 1:
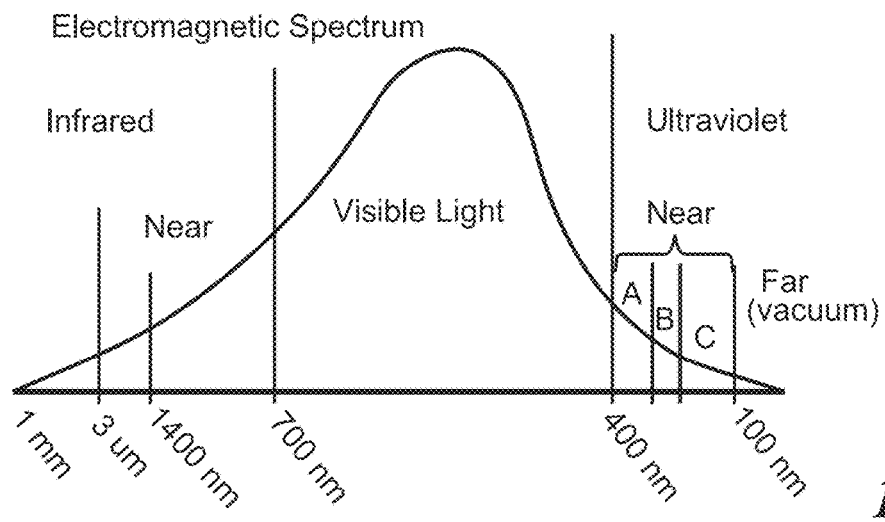
FIG. 1 shows a schematic representation of a general electromagnetic spectrum for wavelengths potentially incident upon a plant, with wavelengths ranging from 1 mm to less than 100 nm.

The following definitions shall be used throughout:

Computer—shall include not only all processors, such as CPU's (Central Processing Units) that employ known architectures, but also any intelligent device that can allow coding, decoding, reading, processing, execution of setting codes or change codes, such as digital optical devices, or analog electrical circuits that perform the same functions.

Dark—when referring to pixel luminance, shall denote either or both of: [1] a relative characteristic, that is, darker than other pixels, or [2] an absolute characteristic, such as a low brightness level.

Frame—shall include time-sequential presentations of image information in video content, consistent with the use of the term frame in industry, but shall also include any partial (e.g., interlaced) or complete image data used to convey video content at any moment or at regular intervals.

Chromaticity—shall be any specification of the quality of a color regardless of, or outside of its luminance, brightness, intensity, luminous intensity, etc. Chromaticity shall include hue, saturation, colorfulness, purity and other measures of color differentiation.

Driver, and Event Process Drivers—shall refer to any electromechanical, hydraulic or other system, whether comprising a single assembly or multiple assemblies, which carries out and effects actual treatment of a target plant over a field according to the instant invention.

Empirically determined—shall refer to adjustments of the referred parameter to serve, or serve best, desired objectives, efficiency, error-free operation and processing speed of a chosen execution of the instant invention as taught herein.

Eradicate—shall denote the killing, impairing or retarding of growth of any plant or life form.

Field—shall denote any surface, including ground surfaces, or surfaces of any material body or manufactured product (such as artificial grass or carpet) upon which the apparatus of the instant invention operates.

Hue—shall be as defined in any color space or color model used to practice the invention, and shall denote color information processed in upper layers of visual cortex that yields sensations that can be compared with a known color wheel.

Inherent spray liquid accumulator—shall denote any system conduit or portion of a system in fluid communication with a pressurized spray liquid used by the invention that is formed and supplied to provide inherent operational pressure upon demand via inherent properties such as expansibility under pressure, and not from an explicit accumulator, such as a spring-loaded piston inside a cylinder, or a bellows or bellows-like device that is not part of a supply line or hose.

Light treatment—shall include any and all treatment utilizing light radiation, including a substantially non-invasive low-energy low irradiance non-mutating method for eradicating a plant in a time under one minute, using a Rapid Unnatural Dual Component Illumination Protocol (RUDCIP) with illumination about the plant, as described in U.S. Pat. No. 8,872,136 to Jackson, et. al.

Luminance—shall be interpreted broadly in this disclosure, including in the appended claims. Most often luminance is a modified radiometric quantity suited to reflect photometric science, guided by empirical data that reflects perceived brightness in a luminosity function derived empirically according to sensitivies of human vision, and subject to geometric considerations like solid angle. Luminance is the radiance weighted by the effect of each wavelength on a human observer, and is commonly measured in candela per square meter (cd/m^2). Luminance herein can also refer to relative luminance, Y/Yn, where Yn is the luminance of the reference white point, as well as luma Y' which is the weighted sum of gamma-corrected R', G', and B' values, and used in Y'CbCr, for JPEG compression and video transmission. Importantly, in the attached specification and claims, luminance can also include brightness; lightness as defined in known colorimetry, such as the HSL color model; value as given in the HSL color model; and intensity, as used in certain RGB coordinate representations and color models. Any quantity that relates directly to weighing or quantifying luminant or radiant strength in this disclosure shall be considered luminance, in contrast to chromaticity, which specifies color appearance.

Maximum value—as in the appended claims, shall denote a maximum value among available values and not necessarily an absolute maximum. When a maximum value of 256 is cited, it is to be interpreted to apply proportionally to any other maximum value employed in any color model.

Thermal/mechanical—trauma shall include any and all treatment utilizing mechanical and thermal trauma, and the invasive hot stab plant eradicator as disclosed in U.S. Pat. Nos. 7,954,276 and 8,141,292, and 8,365,464 to Jackson, which can be modified to provide emission of UV-A radiation (see Light Treatment).

Pixel—shall refer to actual or virtual video picture elements, or equivalent information which allows derivation of pixel information. For vector-based video display systems, a pixel can be any sub-portion of the video output which allows itself to be analyzed or characterized, broadcast, transmitted or stored.

Plant—shall include foliage and all parts of a plant above soil grade, such as stems and leaves. It shall also denote any entity or entities, such as material bodies, for which selective treatment may or may not be desired, depending on analysis as taught in the instant specification, drawings, and claims. Any such entity can be a plant, biological organism or animal (such as a beetle or pest), or any spot or area on a surface, such as a stain on a manufactured product, such as blotch or other defect on artificial grass, e.g., Astroturf®, or a defect on a textile, carpet, flooring, or a composite (such as an aircraft control surface) or other manufactured body, or a portion of land surface, such as a salt flat. The invention can be used to treat or modify entities found on a surface to any end desired, but the emphasis in the specification is illustratively chosen to be in service of removal of unwanted plants from a lawn or land area.

Radiometric selector—shall denote any lens, filter, material body or optical device that can select certain spectral ranges of light, such as by acting as a pass filter for green light.

Rendered—(rendered color space) shall denote an image or color space captured from a sensor, or specific to a source, a camera or image gathering device, which is device and image-specific. Most RGB color spaces are rendered image spaces, including the video spaces used to drive video displays.

Saturation—or colorfulness shall be as defined in any color space or color model used to practice the invention, and shall denote color information that yields sensations that inform the perceived intensity of a specific color. Saturation is often perceived as how much a color is perfused with white or black.

Spray event—shall denote any action taken using the methods of the instant invention to effect a treatment. Treatment can include eradication, fertilizing, disinfecting, or a deposit of any material body, fluid, powder or gas, or irradiation for an intended purpose using the instant invention.

Tristimulus color model—shall include all known tristimulus color models, or three-dimensional color models that can encode color image information, such as an RGB color model, and also any other color model, present or future, such as an opponent color model, that is capable of setoff or segregation of green luminance from a distribution or spectrum of light frequencies under analysis, or segregation or setoff of green from other colors under that model.

DETAILED DESCRIPTION

Figure 4:
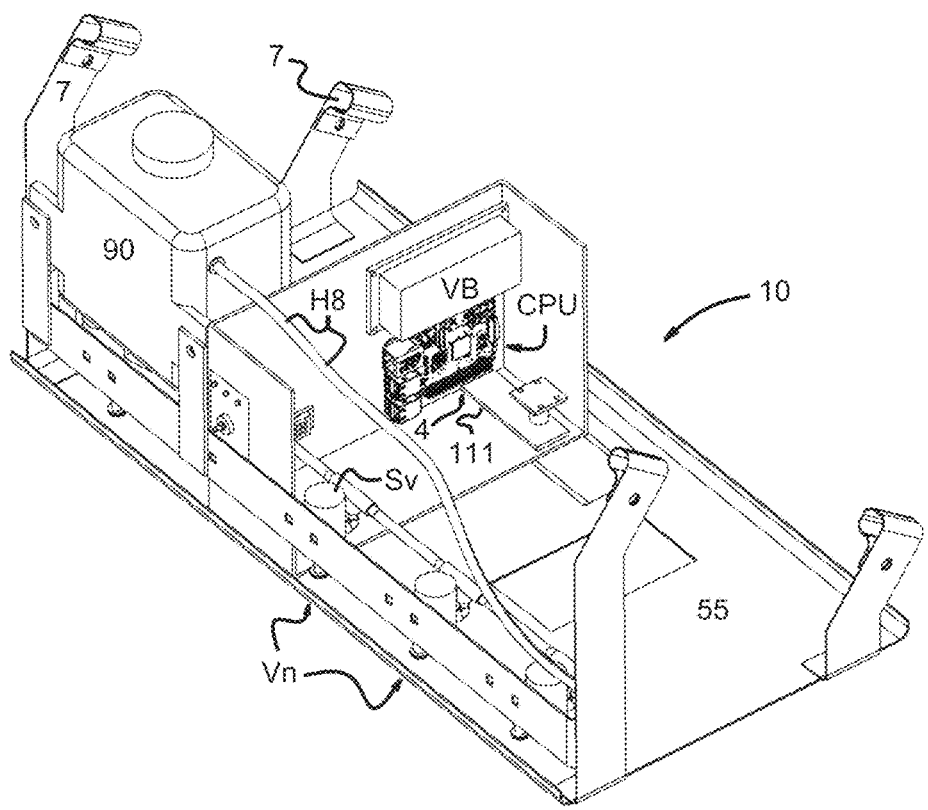
FIGS. 4 and 5 show oblique, partial surface views of an illustrative target plant detection and treatment system according to the invention.
Figure 5:
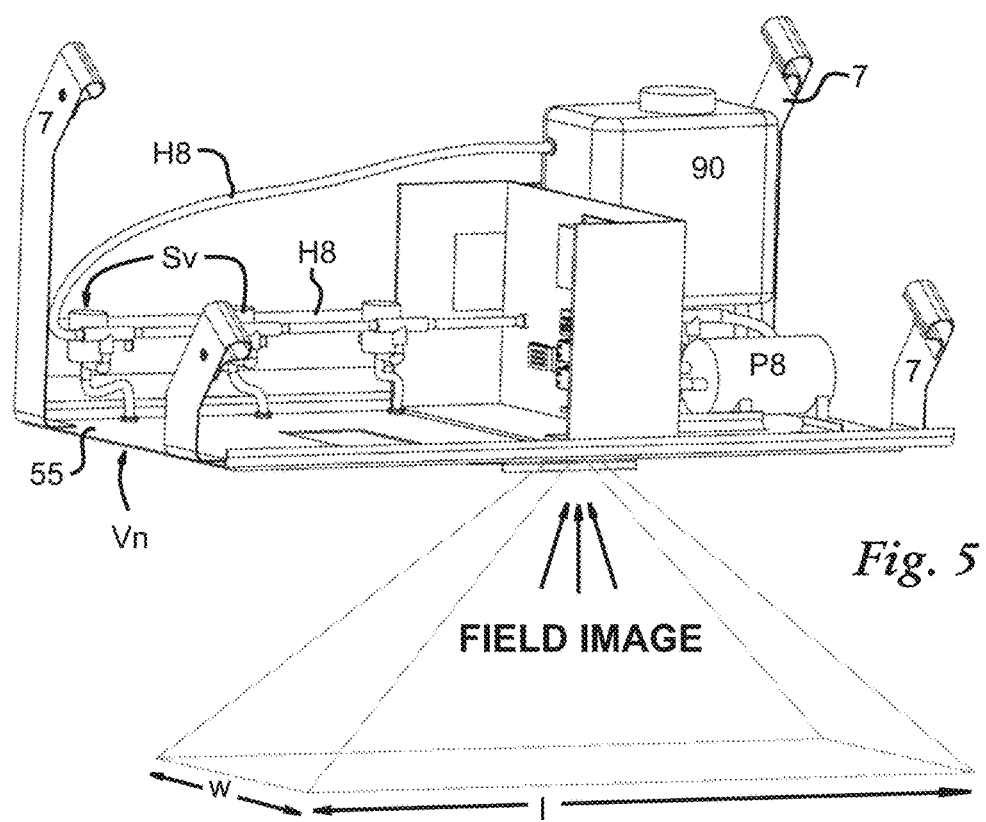

Now referring to FIGS. 4 and 5, oblique, partial surface views of an illustrative target plant detection and treatment system according to the invention are shown. Constituent components affixed to chassis 55 of a target plant detection and treatment system 10 as shown include a known single board computer CPU affixed there and in communication with field image camera with fisheye lens 4, which is not explicitly shown but can use known low cost CMOS active pixel sensors, and is trained downward upon a field as shown on the page, ready to gather a field image (shown, FIELD IMAGE). The single board computer CPU alone does all image capture processing and analysis, using machine instructions programmed as alluded to below. A light source strip 111 is also trained downward and can include commonly available known LED (Light Emitting Diode) lighting that consumes power on the order of single watts. Imaging can occur at various light intensity levels, but the use of supplemental illumination is preferred and can allow the target plant detection and treatment system 10 to be used in the dark. A plurality of mounting straps 7 are so formed as to allow mounting over the pre-existing handles on a lawn machine, mower, tiller or the like.

Broadly, upon detection and location of a target plant, target plant detection and treatment system 10 makes use of a solenoid driver board VB of known design and operation to effect a spray or other event (see discussion below). In this illustrative embodiment, a pump P8 of known construction as shown draws on reservoir 90 and supplies a treatment fluid such as a pesticide or nutrient-containing liquid to an accumulator supply hose H8 set that is in fluid communication with spray solenoids Sv, which in turn provide fluid switching for a plurality of spray nozzles Vn, not explicitly shown. A solenoid driver board VB, the design of which is known to those skilled in the art, provides switching signals to spray solenoids Sv. A shroud surrounding chassis 55 is not shown for clarity.

Figure 2:
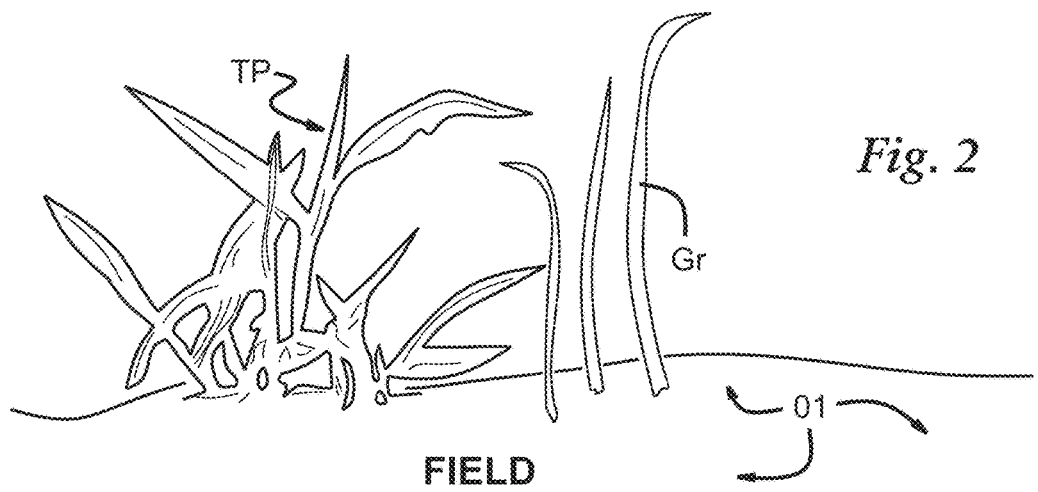
FIG. 2 depicts a target plant and grass on a field.
Figure 3:
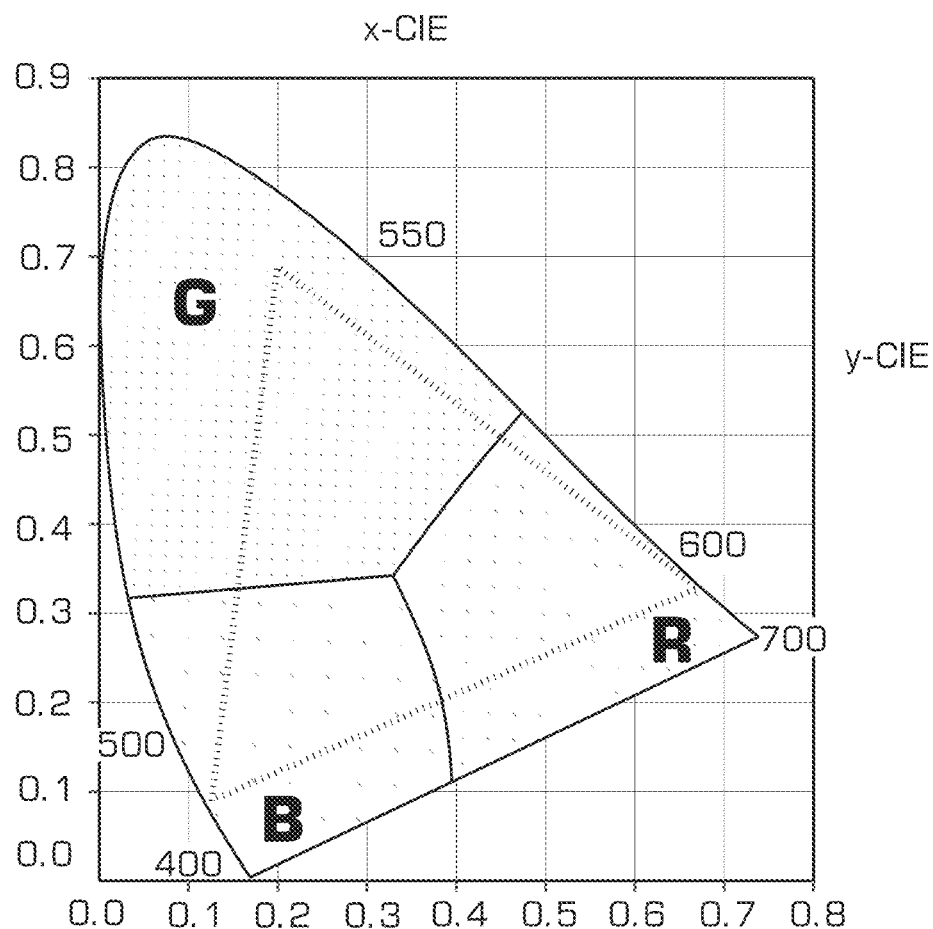
FIG. 3 shows chromaticity coordinates on a standard cartesian 1931 CIE x-y chromaticity diagram.

Target plant detection and treatment system 10 is designed to cross a field as depicted in FIG. 2, and the direction of motion across field is to the right on the page of FIG. 4, so that the camera first arrives at a given point on a field, and after a time of traverse on the field, arrives where spray nozzles Vn are overhead a given feature or target plant.

Once a weed or target plant (as defined herein) has been identified, the position of the target plant is passed to the single board computer CPU which can cause a spray even to occur or cause the positioning and actuation of a device to act according to the instant teachings and as given in the appended claims.

Specifically, the single board computer CPU locates a target plant, then issues known command targeting information, which instructs the spraying system of known operation to spray by sending the spray control commands through a serial port to the solenoid driver board VB. The command instructs the solenoid driver board VB which spray nozzle Sv to turn on, such as by spraying 5 mL (0.17 oz.) over a 4 by 12-inch (10×30 cm) area which constitutes a spray event in one embodiment.

There are 3 processes that are happening sequentially: frame capture and image processing, and command communication to driver electronics with a mechanical response for a spray event. These must be completed within the time it takes for the target plant detection and treatment system 10 (SmartSpray™) to move from where the weed or target plant is located to where the spray event occurs. For this illustrative embodiment, 10 inches (30 cm) was selected as the distance between the field image camera with fisheye lens 4 and the spray nozzles Sv. At 2 MPH (3 km/hr) approximate forward speed of the chassis 55 over the field, this allows 284 milliseconds of total system delay. For the frame capture and image processing, 250 milliseconds was allocated in one embodiment for 8 known image capture frames per second (125 milliseconds) with 2× redundancy. Command communication to the driver electronics is accomplished in 10 milliseconds. To achieve a mechanical (pump, solenoid, spray) response of less than 24 milliseconds, the fluid handling components such as supply hose H8 are pressurized at 10 psi (70 kPa) with 25 ml or more of accumulation in the pumping system and a pump capacity of 25 mL/284 milliseconds (5 nozzles can be sprayed simultaneously), or 5.3 liters/minute. The pumping system design uses an "inherent accumulation" or an inherent spray liquid accumulator so formed and supplied to provide operational pressure upon demand. Specifically, supply hose H8 is designed to expand itself inherently to allow greater than 25 ml inherent accumulation when operating at 10 psi. The system is kept at a constant pressure by pump P8 that continually provides pressure. A safety valve (not shown) can be provided to release overpressures. The approximate distance of the tips of spray nozzles Sv from the field during typical operation is selected for a preferred embodiment of the invention to be 10 cm. Speed of the chassis 55 is established using known moving image analysis (feature speed).

The single board computer CPU captures a field image via the field image camera with fisheye lens 4 with field image (FIELD IMAGE) with width w and length l as shown. For this illustrative embodiment, this area l×w is 7.7 inches by 20 inches (20 cm×51 cm) with 240 by 625 pixels image resolution. This provides 150K pixels on 994 cm^2, translating to 151 pixels/cm^2 or 12.3 pixels per linear centimeter, with a pixel representing 0.81 mm×0.81 mm, or thereabouts, for an area of 0.66 cm^2.

Processing economy afforded by using the methods of the instant invention allow results once only afforded large systems with high processing speeds. Newly available single-board computers are often built on a single circuit board, with a CPU or microprocessor, dynamic or random-access memory (RAM), input/output (I/O) buses, and other features. This allows use of extremely simple and inexpensive single-board computers to be used as embedded computer controllers. This illustrative description uses a small single-board computers developed in the United Kingdom by the Raspberry Pi Foundation (UK). Specifically the invention is shown and discussed illustratively using an installed Raspberry Pi 3. This unit allows programming via a USB port connected to a personal computer, and possesses WIFI and BLUETOOTH capabilities. The Pi series single-board computers constitute an open hardware system with a specially design Linux operating system distribution. It uses a Broadcomm System on a Chip (SoC) which contains many of the primary processing chips found in a laptop or desktop computer.

Even though this SoC contains a Central Processing Unit (CPU), graphics, USB controller, and Random Access Memory (RAM), it does not process instructions in the similar way to its desktop class counterparts. To operate the Pi in the indented use, a known open source operating system (OS) program called Raspian® is used, based on the Debian distribution of Linux, a well known open source OS for computers. Programming can be coded in known Python 3. An associated known Pi Camera is similarly based on open hardware, is specifically designed to be compatible with the Raspberry Pi and is a CMOS serial 5-megapixel camera operated at 864 by 560 pixels and uses equal to or less than 10 watts, according to the Raspberry Pi 3 specification. The Pi Camera can be equipped with a wide angle fisheye lens that allows a 160-degree view. The field image camera with fisheye lens 4 is positioned face down, trained upon the field 01 and is ahead, in time, of the arrival of weeds or target plants passing under spray nozzles Sv during in travel.

Referring now to FIGS. 6 and 7, schematic representations of certain process steps to extract green luminance from a rendered field image according to the invention are shown. Generally, to practice the invention, a field image can be gathered by using at least one of a live video feed and an image capture from the field, and forming a rendered field image therefrom with data generated and formed using a tristimulus color model. In FIG. 6, target plant detection and treatment system 10 is shown in miniature, with a schematic representation of a data stream containing R, G, B information as shown, forming a RENDERED FIELD IMAGE that is going to be manipulated and processed, first with GREEN EXTRACTION. This is shown in great detail in FIG. 7, which shows four different processes that may be used in conjunction with the invention.

By writing command instructions as known by those skilled in the art of writing code, one extracts green luminance from said rendered field image. A first way is to select only colors of said tristimulus color model found in the rendered field image that correspond to light wavelengths in a range from 510 to 590 nm, as first illustrated. An alternative way provides for a narrow band of extraction if desired, as one can select only colors of said tristimulus color model found in the said rendered field image that correspond to light wavelengths in a selection range that includes at least one green band (GREEN BAND) contained in a band selection interval located between 490 and 610 nm, as secondly illustrated. Alternatively one can interpose an optical filter F so positioned and constructed that gathering said field image by field image camera with fisheye lens 4 obtains only primarily light of a wavelength between 510 and 590 nm as shown. One can, for example, use a radiometric or optical selector, which can be any lens, filter, material body or optical device that can select certain spectral ranges of light, such as by acting as a pass filter for green light.

Finally one can gather a corresponding subtraction field image using a known subtraction image camera −4 that retrieves color information outside of green, and using a comparator (COMPARATOR) subtract non-green light correspondingly from said rendered field image so as to leave in said rendered field image at least one band of green light.

A preferred embodiment of the invention uses, for the steps taught here a color model such as known 3-dimensional HSV, HSL, or HSI, color models, which are derivable from the RBG color model using simple transformation equations.

Figure 8:
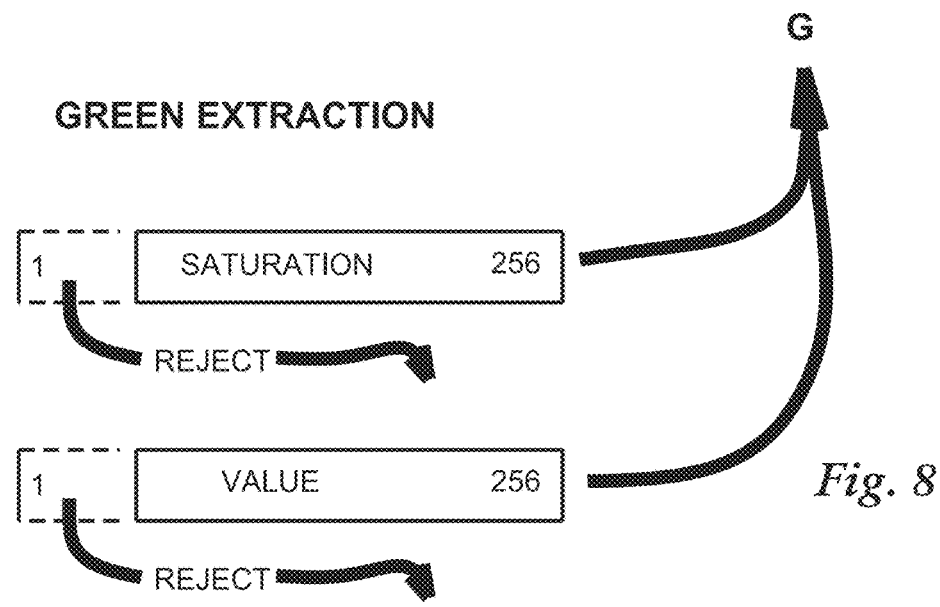
FIG. 8 shows another schematic representation of optional process steps to improve extraction of green luminance from a rendered field image.

Now referring to FIG. 8, another schematic representation of optional process steps to improve extraction of green luminance from a rendered field image is shown. In addition to extracting colorimetric data based on hue, one can take optional steps that have been found to provide for low processing overhead: saturation and value or luminance are used to eliminate further from consideration what is not an image feature formed by a green plant. By machine instructions or programming, one can reject areas of the rendered field image possessing saturation under 35 of a maximum saturation of 256, or under a saturation floor that is empirically determined. One can reject areas of the rendered field image possessing value (or luminance) under 35 of a maximum value of 256, or under a value floor that is empirically determined. This discovery contributes to a success rate found via experimental data that only produces a 10 percent error rate for false positives and false negatives in detecting target plants, which given the low processing overhead and no need to consult a database or examone spectal data in detail, is an advancement of the art.

Figure 9:
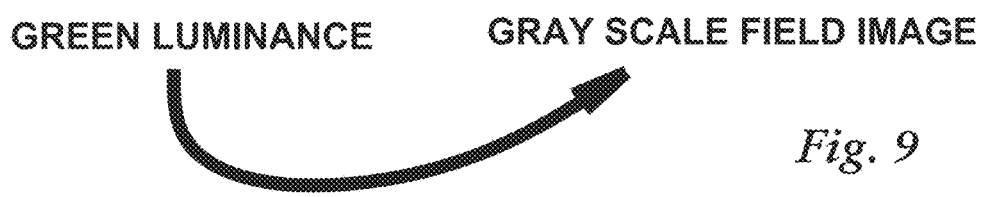
FIG. 9 shows a schematic representation of conversion of green luminance from said rendered field image to a gray scale field image for further processing.

Referring now to FIG. 9, a schematic representation of conversion of green luminance from said rendered field image to a gray scale field image for further processing is shown, as simply a conversion using known steps to effect a transition to gray scale (GREEN LUMINANCE to GRAY SCALE)—processing that uses 256 or some other number of discrete steps between black and white. This is a known step used universally in computer graphics: color information is stripped; hue and saturation are dropped. This speeds up calculations further.

Figure 10:
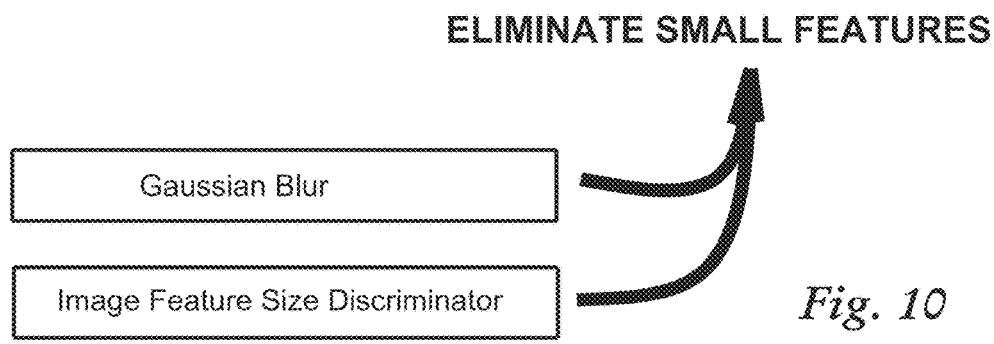
FIG. 10 shows a schematic representation for removing small features from said gray scale field image.

Now referring to FIG. 10, a schematic representation for removing small features from said gray scale field image is shown. This step uses known transforms and mathematical operations, such as by using a known Gaussian Blur (Gaussian Blur) to remove small features or gradients, via a blur effect. The distortion values are determined by a known Gaussian function, and can be applied to each pixel as needed. Alternatively, any Image Feature Size Discrimator can be used, such as well known image analysis that seeks to reduce the number of small features that can be picked up by known edge detectors, preventing higher calculational loads to appear during real-time analysis. Gradients and other signs of a feature edge are analyzed, and sized, with the smaller features dropped from further consideration, as known in the art. There are many known techniques available for feature detection, edge detection and the like that are known to those of ordinary skill in the art, including what is known as blob detection; use of Laplacian of Gaussian operators for scale space theory and to create representations; interest point detection for further processing; Canny edge detectors which use Gaussian filters; Sobel operators; accelerated segment tests; and other techniques in the arts of image analysis and machine vision.

Figure 11:
FIG. 11 shows a detailed black and white photo image of a lawn containing grass and certain potential target plants, as shown in the gray scale field image after removing small features.

Now referring to FIG. 11, a detailed black and white photo image of a lawn containing grass and certain potential target plants is shown, as a gray scale field image after removing small features. Note that major features dominate, there are no filamentary grasses, for example. A target plant TP is labeled at the lower right on the page.

Figure 12:
FIG. 12 shows a schematic representation of a process step Imposing a luminance floor on said gray scale field image to reject relatively darker features therefrom.

Now referring to FIG. 12, a schematic representation of a process step Imposing a luminance floor on said gray scale field image to reject relatively darker features therefrom is shown.

Part of the discovery associated with the instant invention is that an aggressively imposed luminance floor at the gray scale stage helps reduce processing loads. In this step one imposes a luminance floor on the luminance in the gray scale image (GRAY SCALE LUMINANCE) to reject relatively darker features therefrom, by either rejecting gray scale data of luminance under a fraction $180/256$ of the maximum luminance obtainable for pixels in said gray scale field image; or by rejecting gray scale data using an empirically developed effective luminance floor.

Figure 13:
FIG. 13 shows a schematic representation of a process step to detect continuous features in said gray scale field image.

Now referring to FIG. 13, a schematic representation of a process step to detect continuous features in said gray scale field image is shown, (GRAY SCALE FIELD IMAGE, DETECT CONTINUOUS FEATURES). This is accomplished using image analysis using known techniques of image analysis, pattern recognition.

Figure 14:
FIG. 14 shows a detailed representation of continuous features (in white) detected in said gray scale field image from the step shown in FIG. 13.

Now referring to FIG. 14, a detailed representation of continuous features (in white) detected in said gray scale field image from the step shown in FIG. 13 is shown. As can be seen, in reverse image, white silhouettes representing continuous features in the gray scale field image are visible. These continuous features are then further analyzed in the next step.

Figure 15:
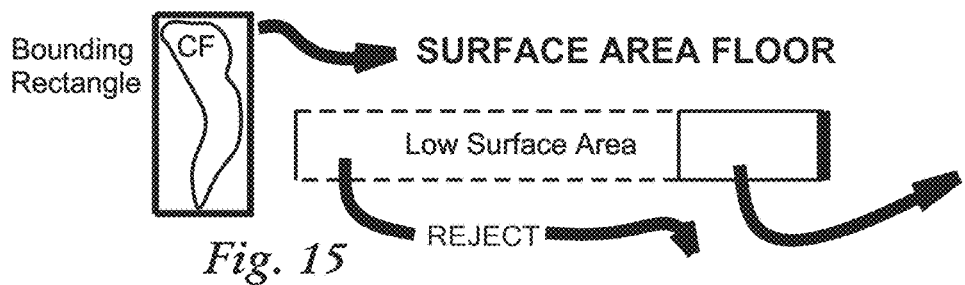
FIG. 15 shows a schematic representation of a process step to establish a surface area floor to reject relatively smaller surface area continuous features to form remaining continuous features in the gray scale field image.

Now referring to FIG. 15, a schematic representation of a process step to establish a surface area floor to reject relatively smaller surface area continuous features to form remaining continuous features in the gray scale field image, is shown. This is an important step which was found to reduce false positives and false negatives substantially. A Bounding Rectangle of minimum size is formed about a selected continuous feature CF as shown, and low surface area features define by their bounding rectangles are discarded or rejected (Low Surface Area).

Specifically, one further imposes a surface area floor on the continuous features, to reject relatively smaller surface area continuous features to form remaining continuous features, with the surface area floor selected from one of either rejecting a surface area corresponding to less than 200 mm^2 on the field, or rejecting a surface area corresponding to a surface area that is empirically determined by examining false negatives and false positives during testing. In this way, grass, minor needles and grass-like plants are ignored and rejected, as shown.

In the illustrative embodiment using the Raspberry Pi 3 single board computer CPU, a threshold of the image is calculated to identify objects which have a large surface area. A program therein then calculates the contours around these objects. Areas considered to be under 350 pixels, or any other number of pixels, determined by experimentally varying the number of pixels as a threshold until false positive and false negative (type 1 and type 2) errors are less than 10%, are considered as outliers in size and are removed.

Figure 16:
FIG. 16 shows a detailed representation of remaining continuous features (in white) obtained via the step shown schematically in FIG. 15.

Now referring to FIG. 16, a detailed representation of remaining continuous features (in white) obtained via the step shown schematically in FIG. 15 is shown. As can now be seen in the Figure, white remaining continuous features are clearly visible and have been isolated from thick, substantial prior detail. Items with larger surface areas, such as well-developed broad-leaf weeds are thus revealed, although there are still smaller filament-like features that remain.

Figure 17:
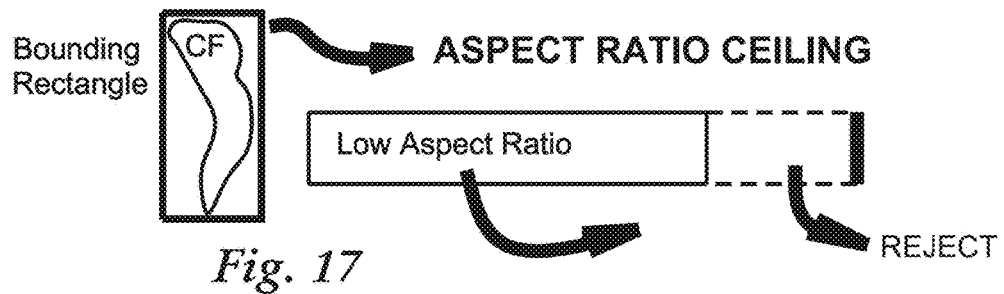
FIG. 17 shows a schematic representation of a process step to impose an aspect ratio ceiling on said remaining continuous features to reject any long features so as possibly to establish at least one target feature in said remaining continuous features.

Now referring to FIG. 17, a schematic representation is shown of a process step to impose an aspect ratio ceiling (ASPECT RATIO CEILING) on said remaining continuous features to reject any long features so as possibly to establish at least one target feature in said remaining continuous features.

It was discovered that the aspect ratio ceiling is a very fast, low overhead and effective way to further isolate target plants without consulting a database of plant images and the like. One can establish a ceiling over which features are rejected, and under which features not rejected, such as a ceiling selected to be on the whole, less than 5:1, or being empirically determined for efficiency in finding said target features and reducing errors. Thus, long, filamentary, grass-like features with high aspect ratios over 5 tend during system operation, to get rejected. This allows for low power, low processing operation over a lawn or other large surface. The remaining features are few and are target features.

Figure 18:
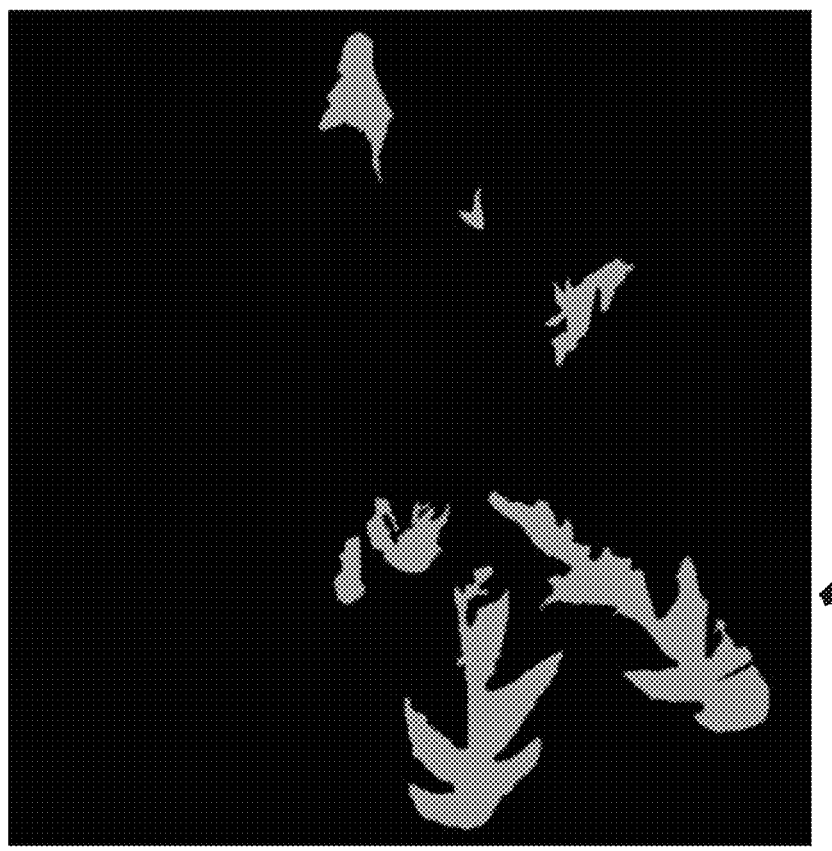
FIG. 18 shows detailed representation of target features (in white) remaining after the step shown schematically in FIG. 17.

Now referring to FIG. 18, a detailed representation of target features (in white) remaining after the step shown schematically in FIG. 17. As can be seen, after comparing with FIG. 11, only seven target features remain. These remaining target features are assembled, located and stored and a decision tree can be followed if desired.

Figure 19:
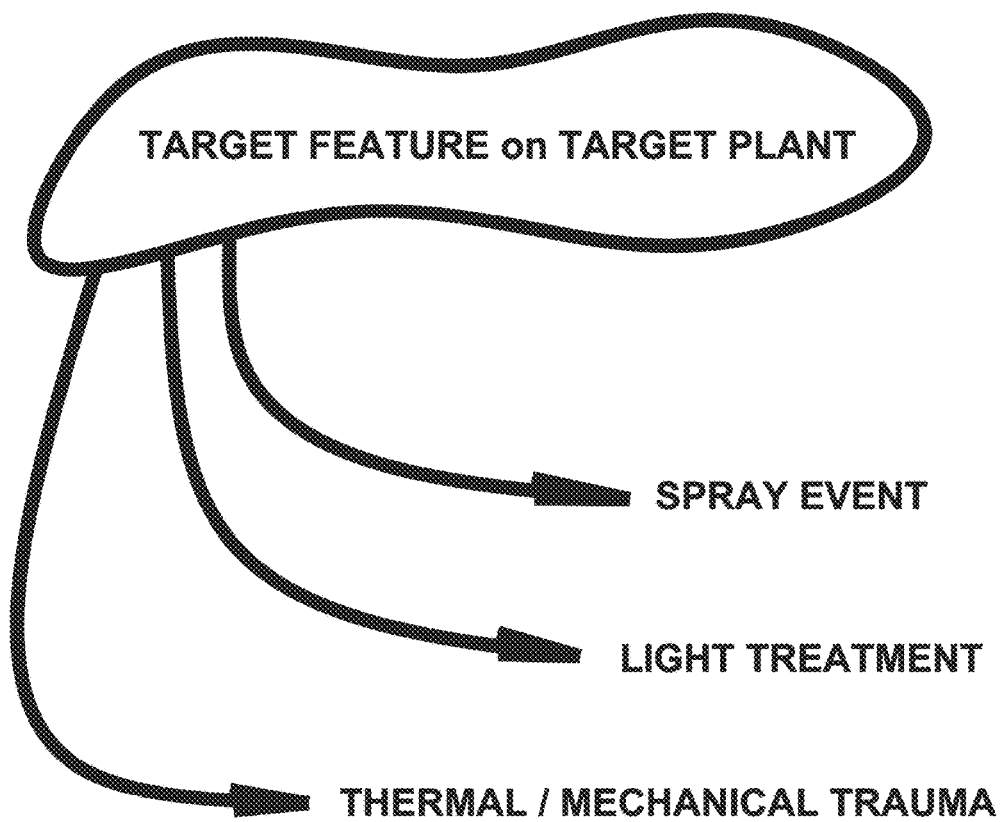
FIG. 19 shows a schematic representation of process steps possible after detecting a target feature on a target plant.

Now referring to FIG. 19, a schematic representation of process steps possible after detecting a target feature on a target plant is shown, where a TARGET FEATURE on TARGET PLANT is considered, and using known command logic, position calculations and mechanical response, action is taken. Possible actions include a SPRAY EVENT, a LIGHT TREATMENT, and THERMAL/MECHANICAL TRAUMA, as those skilled in the art can envision using the references incorporated herein in the TECHNICAL FIELD section above.

One method for gathering a field image is by using video frames or packets from a video camera directed at the field, often with supplemental illumination. The teachings given here can be applied to a mobile unit separate from the liquid spray portions of target plant detection and treatment system 10, as those of ordinary skill can devise.

In a preferred embodiment, the selective herbicide treatment obtained only treats broadleaf weeds while leaving grass unaffected, thus helping prevent turfgrass from browning due to over spraying with water.

The system using the instant teachings is relatively insensitive to false positives, identifying grass as a weed, and also to false negatives, identifying a weed as grass.

Video signals used in gather a field image can comprise known digital data frames or packets like those used for MPEG encoding, audio PCM encoding, etc. One can use known encoding schemes for data packets such as program streams with variable length data packets, or transport streams which divide data packets evenly, or other schemes such single program transport streams. Alternately, the functional steps or blocks given in this disclosure can be emulated using computer code and other communications standards, including asynchronous protocols. This can allow independent, parallel, direct, delayed, continuous, periodic, or aperiodic transfer of selected video content in service of this invention to another device. Nothing in this disclosure precludes transformations that can take the form of chromaticity-by-chromaticity mapping, perhaps contained in a lookup table (LUT), or that can be embodied in machine code, software, a data file, an algorithm or a functional operator.

The invention can be used simply to detect a target feature in a field image using low processing overhead, with the method comprising forming a rendered field image from the field image with data generated and formed using a tristimulus color model and proceeding as given above without triggering any spray event, light treatment or thermal/mechanical trauma. This is useful for cataloging, for example, weeds or particular plants in a database with minimum processing overhead, and is to be found in the appended claims.

As will be understood by those skilled in the art, the apparatus as suggested herein is but a mere example, and the invention can take the form of a walk-behind unit; a mobile unit, powered or unpowered, that moves across a field.

There is obviously much freedom to exercise the elements or steps of the invention.

The description is given here to enable those of ordinary skill in the art to practice the invention. Many configurations are possible using the instant teachings, and the configurations and arrangements given here are only illustrative.

Those with ordinary skill in the art will, based on these teachings, be able to modify the invention as shown.

The invention as disclosed using the above examples may be practiced using only some of the optional features mentioned above. Also, nothing as taught and claimed here shall preclude addition of other structures or functional elements.

Obviously, many modifications and variations of the present invention are possible in light of the above teaching. It is therefore to be understood that, within the scope of the appended claims, the invention may be practiced otherwise than as specifically described or suggested here.

We claim:

1. A method for detection and selective treatment of a target plant on a field, said method comprising:
   [1] Gathering a field image using at least one of a live video feed and an image capture from said field, and forming a rendered field image therefrom with data generated and formed using a tristimulus color model;
   [2] Extracting only green luminance from said rendered field image by one of [2a] selecting only colors of said tristimulus color model found in said rendered field image that correspond to light wavelengths in a range from 510 to 590 nm; [2b] selecting only colors of said tristimulus color model found in said rendered field image that correspond to light wavelengths in a selection range that includes at least one green band contained in a band selection interval located between 490 and 610 nm; [2c] interposing an optical filter so positioned and constructed that gathering said field image obtains only primarily light of a wavelength between 510 and 590 nm; and [2d] gathering a corresponding subtraction field image using a subtraction image camera, and using a comparator, subtracting non-green light correspondingly from said rendered field image so as to leave in said rendered field image at least one band of green light;
   [3] Converting green luminance from said rendered field image to a gray scale field image and utilizing said gray scale field image further without hue and saturation being considered;
   [4] Eliminating data by performing at least one of the following:
      [4a] Eliminating small features from said gray scale field image, using at least one of a Gaussian blur and an image feature size discriminator, so as to reduce processing load;
      [4b] Imposing a luminance floor on said gray scale field image to reject relatively darker features therefrom, said luminance floor selected from rejecting data of luminance under a fraction $180/256$ of the maximum luminance obtainable for pixels in said gray scale field image; and an empirically developed effective luminance floor;
   [5] Detecting continuous features in said gray scale field image;
   [6] Further imposing a surface area floor on said continuous features, to reject relatively smaller surface area continuous features to form remaining continuous features, said surface area floor selected from one of:
      [6a] rejecting a surface area corresponding to less than 200 mm^2 on said field, and
      [6b] rejecting a surface area corresponding to a surface area that is empirically determined;
   [7] Further imposing an aspect ratio ceiling on said remaining continuous features to reject any long features so as possibly to establish at least one target feature in said remaining continuous features, said aspect ratio ceiling selected from one of said aspect ratio being, on the whole, less than 5:1, and said aspect ratio ceiling being empirically determined for efficiency in finding said target feature;
   [8] Triggering a communication responsive to obtaining said at least one target feature so as to trigger at least one of:
      [8a] a spray event so sized and situated as to treat at least a portion of a target plant revealed by said target feature;
      [8b] a light treatment to impinge upon at least a portion of a target plant revealed by said target feature; and
      [8c] a thermal/mechanical trauma instant upon at least a portion of a target plant revealed by said target feature.

2. The method of claim 1, wherein step [2] additionally comprises further green plant selection selected from any of:
   [2e] rejecting areas of said rendered field image of saturation under 35 of a maximum saturation of 256,
   [2f] rejecting areas of said rendered field image of saturation under a saturation floor empirically determined,
   [2g] rejecting areas of said rendered field image of value floor under a value of 35 out of a maximum value of 256, and
   [2h] rejecting areas of said rendered field image of value floor empirically determined.

3. The method of claim 1, wherein steps [1]-[8] are executed in real time such that steps [8a] and [8b] and [8c] can occur with a time spacing for traverse of at least a portion of a machine gathering said field image of step [1] and moving across said field.

4. The method of claim 3, wherein step [8a] is executed with dispatch aided by an inherent spray liquid accumulator so formed and supplied to provide operational pressure upon demand.

5. A method for detecting a target feature in a field image using low processing overhead, said method comprising:
   [1] Forming a rendered field image from said field image with data generated and formed using a tristimulus color model;
   [2] Extracting only green luminance from said rendered field image by one of [2a] selecting only colors of said tristimulus color model found in said rendered field image that correspond to light wavelengths in a range from 510 to 590 nm; [2b] selecting only colors of said tristimulus color model found in said rendered field image that correspond to light wavelengths in a selection range that includes at least one green band contained in a band selection interval located between 490 and 610 nm; [2c] interposing an optical filter so positioned and constructed that gathering said field image obtains only primarily light of a wavelength between 510 and 590 nm; and [2d] gathering a corresponding subtraction field image using a subtraction image camera, and using a comparator, subtracting non-green light correspondingly from said rendered field image so as to leave in said rendered field image at least one band of green light;

[3] Converting green luminance from said rendered field image to a gray scale field image and utilizing said gray scale field image further without hue and saturation being considered;

[4] Eliminating data by performing at least one of the following:
 [4a] Eliminating small features from said gray scale field image, using at least one of a Gaussian blur and an image feature size discriminator, so as to reduce processing load;
 [4b] Imposing a luminance floor on said gray scale field image to reject relatively darker features therefrom, said luminance floor selected from rejecting data of luminance under a fraction $^{180}/_{256}$ of the maximum luminance obtainable for pixels in said gray scale field image; and an empirically developed effective luminance floor;

[5] Detecting continuous features in said gray scale field image;

[6] Further imposing a surface area floor on said continuous features, to reject relatively smaller surface area continuous features to form remaining continuous features, said surface area floor selected from one of:
 [6a] rejecting a surface area corresponding to less than 200 mm^2 on said field, and
 [6b] rejecting a surface area corresponding to a surface area that is empirically determined; and

[7] Further imposing an aspect ratio ceiling on said remaining continuous features to reject any long features so as possibly to establish at least one target feature in said remaining continuous features, said aspect ratio ceiling selected from one of said aspect ratio being, on the whole, less than 5:1, and said aspect ratio ceiling being empirically determined for efficiency in finding said target feature.

6. The method of claim 5, wherein step [2] additionally comprises further green selection selected from any of:
 [2e] rejecting areas of said rendered field image of saturation under 35 of a maximum saturation of 256,
 [2f] rejecting areas of said rendered field image of saturation under a saturation floor empirically determined,
 [2g] rejecting areas of said rendered field image of value floor under a value of 35 out of a maximum value of 256,
 [2h] rejecting areas of said rendered field image of value floor empirically determined.

* * * * *